(12) United States Patent
Wan et al.

(10) Patent No.: US 7,724,186 B2
(45) Date of Patent: May 25, 2010

(54) ENHANCED AIDING IN GPS SYSTEMS

(75) Inventors: Marlene Wan, Sunnyvale, CA (US);
Lionel Garin, Palo Alto, CA (US);
Gengsheng Zhang, Cupertino, CA (US)

(73) Assignee: SIRF Technology, Inc., San Jose, CA (US)

( * ) Notice: Subject to any disclaimer, the term of this patent is extended or adjusted under 35 U.S.C. 154(b) by 37 days.

(21) Appl. No.: 11/772,102

(22) Filed: Jun. 29, 2007

(65) Prior Publication Data

US 2008/0122690 A1    May 29, 2008

Related U.S. Application Data

(60) Provisional application No. 60/818,421, filed on Jun. 30, 2006.

(51) Int. Cl.
*G01S 1/00* (2006.01)
(52) U.S. Cl. .............................. 342/357.1; 342/357.06
(58) Field of Classification Search ................................ 342/357.01–357.14
See application file for complete search history.

(56) References Cited

U.S. PATENT DOCUMENTS

| | | | |
|---|---|---|---|
| 5,663,734 A | 9/1997 | Krasner |
| 5,663,735 A | 9/1997 | Eshenbach |
| 5,781,156 A | 7/1998 | Krasner |
| 5,812,087 A | 9/1998 | Krasner |
| 5,825,327 A | 10/1998 | Krasner |
| 5,831,574 A | 11/1998 | Krasner |
| 5,841,396 A | 11/1998 | Krasner |
| 5,874,914 A | 2/1999 | Krasner |
| 5,884,214 A | 3/1999 | Krasner |
| 5,945,944 A | 8/1999 | Krasner |
| 5,999,124 A | 12/1999 | Sheynblat |
| 6,002,363 A | 12/1999 | Krasner |
| 6,016,119 A | 1/2000 | Krasner |
| 6,052,081 A | 4/2000 | Krasner |
| 6,061,018 A | 5/2000 | Sheynblat |
| 6,064,336 A | 5/2000 | Krasner |
| 6,104,338 A | 8/2000 | Krasner |
| 6,104,340 A | 8/2000 | Krasner |
| 6,107,960 A | 8/2000 | Krasner |

(Continued)

FOREIGN PATENT DOCUMENTS

WO    WO01/54091    7/2001

OTHER PUBLICATIONS

Marketing Material: Qualcomm CDMA Technologies—Integrated Solutions—MGP6200™ Multimode GPS Processor (8 pages).

(Continued)

*Primary Examiner*—Thomas H Tarcza
*Assistant Examiner*—Harry Liu
(74) *Attorney, Agent, or Firm*—Mark J. Danielson; Pillsbury Winthrop Shaw Pittman LLP

(57) ABSTRACT

An Aided Location Communication System ("ALCS") is described. The ALCS may include a geolocation server including a non-GPS position server, at least one server aiding database, server position-determination module, and a server fusion module. The ALCS may also include an Aided Location Communication Device ("ALCD") including a communication section in signal communication with the geolocation server, and a position-determination section having a GPS Engine.

11 Claims, 8 Drawing Sheets

U.S. PATENT DOCUMENTS

| | | | |
|---|---|---|---|
| 6,111,540 | A | 8/2000 | Krasner |
| 6,131,067 | A | 10/2000 | Girerd |
| 6,133,871 | A | 10/2000 | Krasner |
| 6,133,873 | A | 10/2000 | Krasner |
| 6,133,874 | A | 10/2000 | Krasner |
| 6,150,980 | A | 11/2000 | Krasner |
| 6,185,427 | B1 | 2/2001 | Krasner |
| 6,208,290 | B1 | 3/2001 | Krasner |
| 6,208,291 | B1 | 3/2001 | Krasner |
| 6,215,441 | B1 | 4/2001 | Moeglein |
| 6,215,442 | B1 | 4/2001 | Sheynblat |
| 6,236,354 | B1 | 5/2001 | Krasner |
| 6,239,742 | B1 | 5/2001 | Krasner |
| 6,259,399 | B1 | 7/2001 | Krasner |
| 6,272,430 | B1 | 8/2001 | Krasner |
| 6,289,041 | B1 | 9/2001 | Krasner |
| 6,307,504 | B1 | 10/2001 | Sheynblat |
| 6,313,786 | B1 | 11/2001 | Sheynblat |
| 6,314,308 | B1 | 11/2001 | Sheynblat |
| 6,377,209 | B1 | 4/2002 | Krasner |
| 6,408,196 | B2 | 6/2002 | Sheynblat |
| 6,411,254 | B1 | 6/2002 | Moeglein |
| 6,411,892 | B1 | 6/2002 | Van Diggelen |
| 6,417,801 | B1 | 7/2002 | Van Diggelen |
| 6,421,002 | B2 | 7/2002 | Krasner |
| 6,429,812 | B1 * | 8/2002 | Hoffberg .................. 342/357.1 |
| 6,429,814 | B1 | 8/2002 | Van Diggelen et al. |
| 6,433,731 | B1 | 8/2002 | Sheynblat |
| 6,453,237 | B1 | 9/2002 | Fuchs et al. |
| 6,484,097 | B2 | 11/2002 | Fuchs et al. |
| 6,487,499 | B1 | 11/2002 | Fuchs et al. |
| 6,510,387 | B2 | 1/2003 | Fuchs et al. |
| 6,542,821 | B2 | 4/2003 | Krasner |
| 6,583,757 | B2 | 6/2003 | Krasner |
| 6,597,311 | B2 | 7/2003 | Sheynblat |
| 6,671,620 | B1 | 12/2003 | Garin et al. |
| 2002/0082774 | A1 * | 6/2002 | Bloebaum .................. 701/213 |
| 2004/0203915 | A1 * | 10/2004 | van Diggelen et al. ... 455/456.1 |
| 2007/0085690 | A1 * | 4/2007 | Tran ........................ 340/573.1 |

OTHER PUBLICATIONS

U.S. Appl. No. 06/038,719, filed Feb. 23, 2006, Pande et al.

Marketing Material: uNav Microelectronics—uN9x18 Low Power, High Performance GPS Receiver Chipset/uN9x18 GPS Receiver Solution (9 pages).

Marketing Material: uNav Microelectronics, uN9x18 Low Power, High Performance GPS Receiver Chipset (2 pages).

Marketing Material: Global Locate—Hammerhead II™, Single Chip AGPS Solution (2 pages).

Marketing Material/Press Release: Broadcom Introduces Advanced Single-Chip GPS Solution for Mobile Applications (3 pages).

Marketing Material/White Paper: SnapTrack: A Qualcomm Company—SnapTrack's Wireless Assisted GPS™ (A-GPS) Solution Provides the Industry's Best Location System—Location Technologies for GSM, GPRS and WCDMA Networks (Qualcomm CDMA Technologies: Enabling the Future of Communications) (4 pages).

* cited by examiner

ENHANCED AIDING IN GPS SYSTEMS

CROSS REFERENCE TO RELATED APPLICATIONS

This application claims priority under Section 119(e) to U.S. Provisional titled "Architecture for Hybrid Positioning with Position Refinement and Intelligent Cross-Technology," Application Ser. No. 60/818,421, filed Jun. 30, 2006, all of which are incorporated into this application by reference in their entirety.

BACKGROUND OF THE INVENTION

1. Field of Invention

This invention relates in general to Global Positioning System ("GPS") receivers, and in particular to a network aided GPS systems.

2. Related Art

Cellular telephony, including the use of Personal Communication System ("PCS") devices, has become commonplace. The use of such devices to provide voice, data, and other services, such as Internet access, has provided many conveniences to cellular system users.

A current thrust in the cellular and PCS area is the integration of Global Positioning System ("GPS") technology into cellular telephone devices and other wireless devices. For example, U.S. Pat. No. 5,874,914, issued to Krasner, which is incorporated by reference herein in it's entirety, describes a method where a basestation (also known as the Mobile Telephone Switching Office ("MTSO")) transmits GPS satellite information, including Doppler information, to a remote unit using a cellular data link, and computing pseudoranges to the in-view satellites of the GPS constellation without receiving or using satellite ephemeris information.

This current interest in integrating GPS with cellular telephony stems from a Federal Communications Commission ("FCC") requirement that cellular telephones be locatable within 50 feet once an emergency call, such as a "911" call (also referred to as Enhanced 911 or "E911") is placed by a given cellular telephone. This position data assists police, paramedics, and other law enforcement and public service personnel, as well as other agencies that may need or have legal rights to determine the cellular telephone's position. Further, GPS data can be used by the cellular user for directions, location of other locations that the cellular user is trying to locate, determination of relative location of the cellular user to other landmarks, directions for the cellular user via Internet maps or other GPS mapping techniques, etc. Such data can be of use for other than E911 calls, and would be very useful for cellular and PCS subscribers.

However, since cellular telephones can travel into areas where GPS signals cannot be reliably received, augmentations to the GPS system are being researched to support the E911 and other GPS/cellular applications. GPS is increasingly being pressed into service in the cellular telephone/PDA/mobile computer application where a solution is required in areas with substantial blockage, such as inside buildings, in subway stations, and other areas where the system RF link budget is unable to sustain communications with mobile units that travel into hostile signal reception environments such a buildings. Pseudolites are well-known commercially available ground-based transmitters which augment the orbiting GPS constellation with one or more additional transmitters to improve the availability and quality of a GPS solution. Current pseudolite applications include local-area augmentation system ("LAAS") transmitters for precision approach.

At present a number of different types of GPS assistance or aiding systems and architectures are known. Examples of these systems include aiding system designed and produced by companies such as Qualcomm of San Diego, Calif. and SiRF Technology, Inc. of San Jose, Calif. Generally, any type of aiding and/or assisting in obtaining a GPS location is referred to as Aided GPS ("AGPS" or "A-GPS").

Unfortunately, the different type of aiding systems presently known only support known AGPS functionalities and lack the capability of providing "anytime and anywhere" positioning and better location application support.

SUMMARY

An Aided Location Communication System ("ALCS") is described. The ALCS may include a geolocation server including a non-GPS position server, at least one server aiding database, server position-determination module, and a server fusion module. The ALCS may also include an Aided Location Communication Device ("ALCD") including a communication section in signal communication with the geolocation server, and a position-determination section having a GPS Engine. The ALCD is capable of selectively switching between a first position-determination mode for determining a geolocation of the ALCD and a second position-determination mode for determining the geolocation of the ALCD.

As an example of operation, the ALCD may perform a method for determining the geolocation of the ALCD including measuring characteristic information for a communication network of the ALCS and comparing the measured characteristic information against position data stored in an aiding database. The method further includes determining an initial coarse position for the ALCD based on the comparison of the measured characteristic information against position and/or measurement data stored in an aiding database and determining whether the initial coarse position is acceptable. If the initial coarse position is acceptable, the method fuses the measured characteristic information with the initial coarse position and if the initial coarse position is not acceptable, the method determines the position of the ALCD utilizing other information and fuses the measured characteristic information with the determined position of ALCD. The method then updates the aiding database with the fused data.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
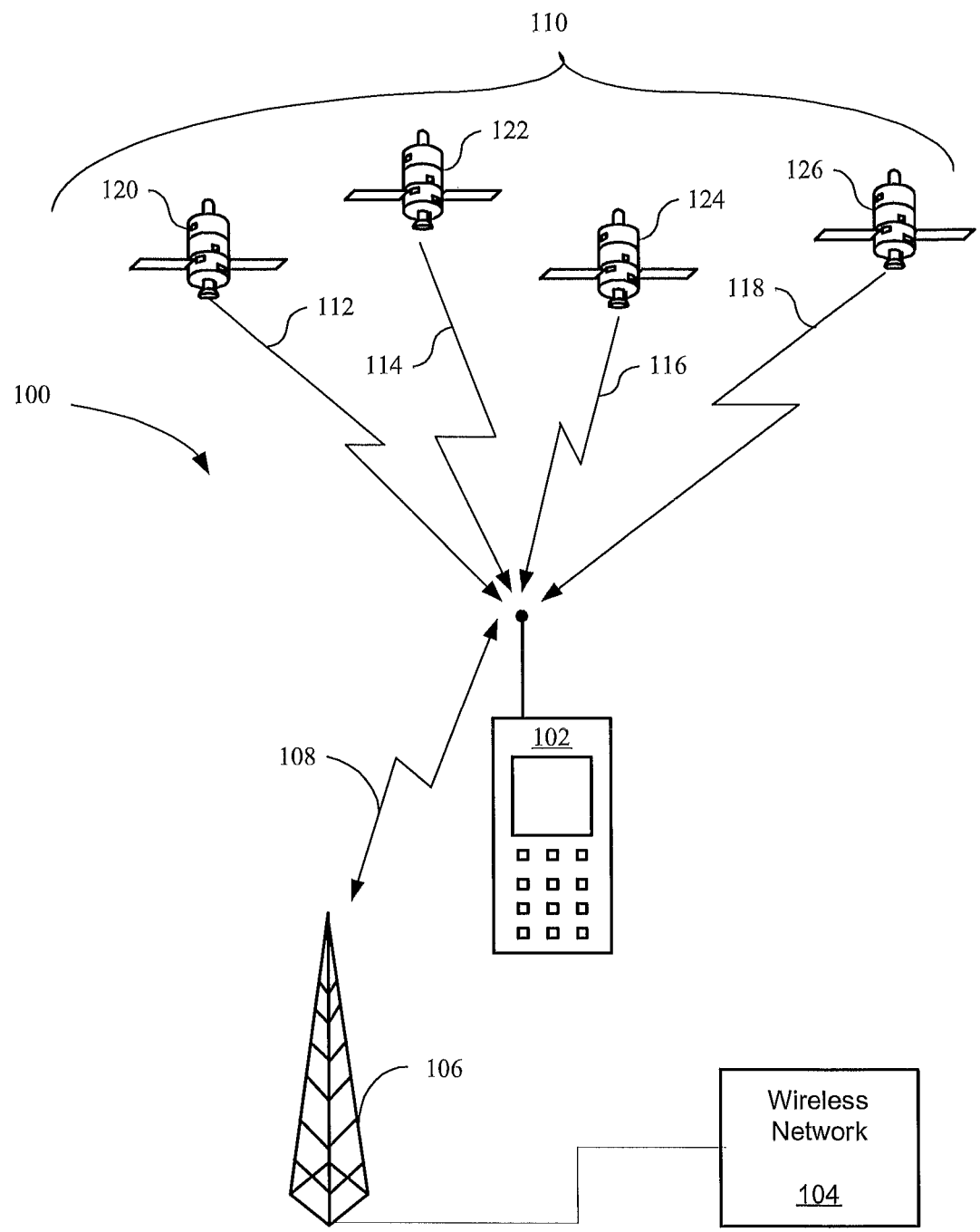
FIG. 1 is a system diagram of an example of an implementation of an Aided Location Communication System ("ALCS") utilizing an Aided Location Communication Device ("ALCD").

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of this invention.

Overview

In general, GPS systems are typically satellite (also known as "space vehicle" or "SV") based navigation systems and it is appreciated, by those skilled in the art, that GPS systems include Satellite Positioning System ("SPS") and/or Navigation Satellite Systems. Examples of GPS systems include but are not limited to the United States ("U.S.") Navy Navigation Satellite System ("NNSS") (also know as TRANSIT), LORAN, Shoran, Decca, TACAN, NAVSTAR, the Russian counterpart to NAVSTAR known as the Global Navigation Satellite System ("GLONASS") and any future Western European GPS such as the proposed "Galileo" program. As an example, the US NAVSTAR GPS system is described in GPS Theory and Practice, Fifth ed., revised edition by Hofmann-Wellenhof, Lichtenegger and Collins, Springer-Verlag Wien New York, 2001, which is fully incorporated herein by reference.

When integrating GPS system components with wireless communications systems (that may include cellular, paging, two-way paging, Personal Data Assistant "PDA", Bluetooth, Wi-Fi and PCS type systems), the GPS system should have the capability to acquire and track the GPS satellites under conditions that a typical wireless communications system user may encounter. Some of these conditions may include indoor use, use in dense urban areas that have limited sky view (such as in downtown areas with skyscrapers blocking satellite views, etc.). Although these conditions are typically manageable for terrestrial-based wireless communications systems, they are difficult environments for GPS systems. For example, in a traditional "GPS-standalone" mode where a GPS receiver acquires the signals from the GPS satellites, tracks the satellites, and, if desired, performs navigation without any outside information being delivered to the GPS system, typical GPS receivers have problems with long Time-To-First-Fix ("TTFF") times, and, further, have limited ability to acquire the GPS satellite signals under indoor or limited sky-view conditions. Even with some additional information, TTFF times may be over thirty seconds because ephemeris data must be acquired from the GPS system itself, which typically requires a strong GPS signal to acquire ephemeris data reliably. These conditions usually impact the reliability of the position availability, as well as, the power consumption within wireless communication devices such as, for example, cellular telephones.

To overcome these problems, an Aided Location Communication Device ("ALCD") is described that allows for multiple modes of operation depending on various factors. The ALCD may be a cellular telephone, paging device, two-way pager, PDA, Bluetooth® enabled device, Wi-Fi enable device, laptop computer, desktop computer, non-mobile device and/or PCS system. The ALCD may also be a semiconductor integrated circuit (i.e., a chip or chipset) within a device such as, for example, a cellular telephone, paging device, two-way pager, PDA, Bluetooth enabled device, Wi-Fi enable device, laptop computer, desktop computer, non-mobile device and/or PCS system.

FIG. 1 is a system diagram of an example of an implementation of an Aided Location Communication System ("ALCS") 100 utilizing the ALCD 102 having a communication section (not shown) and a position-determination section (not shown) with a GPS receiver (not shown). The communication section includes a communication processing section generally known as a call processing ("CP") section. As shown in FIG. 1, during operation, the ALCD 102 is in signal communication with a wireless network 104 via a basestation 106 and signal path 108 and is in signal communication with at least one GPS satellite of the GPS satellite constellation 110 via signal paths 112, 114, 116 and 118. It is appreciated by those skilled in the art that while only four GPS satellites 120, 122, 124 and 126 are shown, the GPS satellites 120, 122, 124 and 126 may be any number of GPS satellites from the GPS constellation 110 that are visible to ALCD 102. Additionally, it is appreciated that signal communication refers to any type of communication and/or connection between devices that allows a given device to pass and/or receive signals and/or information from another device. The communication and/or connection may be along any signal path between the devices that allows signals and/or information to pass from one device to another and includes wireless and wired signal paths. The signal paths may be physical such as, for example, conductive wires, electromagnetic wave guides, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components and/or devices where communication information is passed from one device to another in varying digital formats without passing through a direct electromagnetic connection.

The GPS receiver within the ALCD 102 may receive GPS signals from the GPS satellite constellation 110 via signal paths 112, 114, 116 and 118 and the communication section of the ALCD 102 may receive wireless communication signals from the wireless network 104 via signal path 108 and basestation 106. In some implementations, the ALCD 102 may also send wireless communication signals to the wireless network 104 via signal path 108 and basestation 106. The ALCD 102 may be a wireless device such as a cellular telephone (also known as a wireless handset, cellphone, mobile telephone or mobile phone) or any other type of mobile device, including, but not limited to, personal digital assistants ("PDAs"), pagers, computer, two-way radio, trunked radio, specialized mobile radio ("SMR") or any other device for which it is desirable to determine location information. The ALCD 102 may also be a semiconductor integrated circuit (i.e., a chip) located within the wireless device or a combination of semiconductor integrated circuits (i.e., a chipset) located within the wireless device. Examples of the chip, or chipset, may any include any integrated circuit having a GPS receiver and a transceiver which may include application specific integrated circuit ("ASIC") or ASICs and digital signal processor ("DSP") or DSPs. In the case of a cellular telephone, the ALCD 102 may utilize a cellular transceiver in the communication section that operates at any radio frequency ("RF") band utilizing any transmission schemes including but not limited to CDMA, CDMA-2000, W-CDMA, TDMA, FDMA, GSM, UMTS, AMPS, Bluetooth®, Wi-Fi and/or any combination or extension of these transmission schemes or similar schemes.

Figure 2:
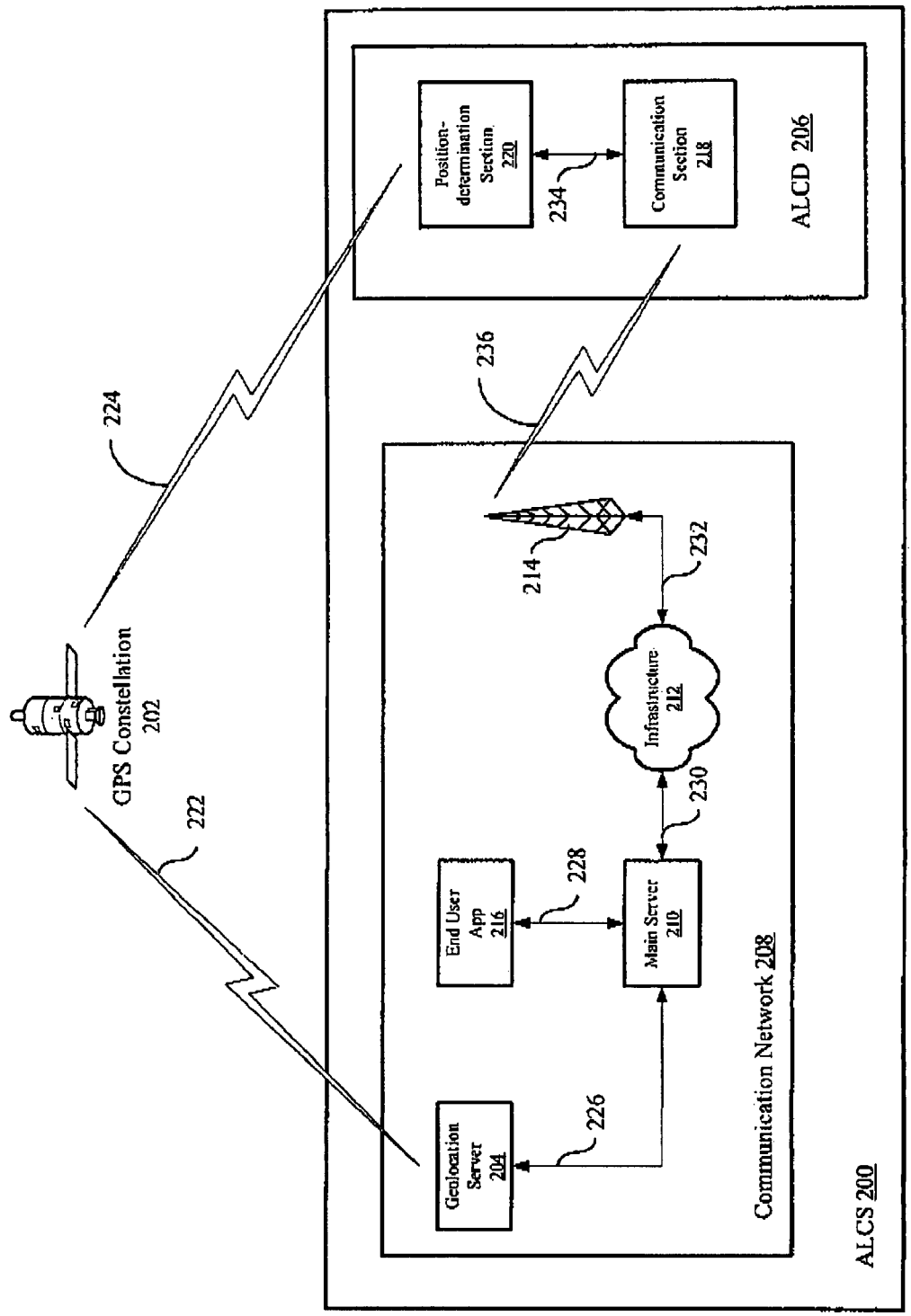
FIG. 2 is a block diagram of an example of an end-to-end implementation of an ALCS in signal communication with GPS satellites.

In FIG. 2, a block diagram of an example of an end-to-end implementation of an ALCS 200 in signal communication with GPS satellites of the GPS satellite constellation 202 is shown. The ALCS 200 includes a Geolocation Server 204 and an ALCD 206. The Geolocation Server 204 is part of a communication network 208 that also includes a main server 210, communication network infrastructure 212, basestation 214, and end-user application 216. The ALCD 206 includes a communication section 218 and position-determination section 220. In general, the ALCS 200 may be described as having two portions to the system. The first portion (shown as the Communication Network 208) may be generally referred to as the "server-side" of the ALCS 200 and the second portion (shown as the ALCD 206) may be generally referred to as the "client-side" of the ALCS 200. As a result, it appreciated by those skilled in the art that many components, modules, sections, and/or devices may be generally described as either "server" or "client" type of components, modules, sections and/or devices based on their location relative to the Communication Network 208 or ALCD 206.

As an example, the Geolocation Server 204 and position-determination section 220 both receive GPS signals from the GPS constellation 202 via signal paths 222 and 224, respectively. Additionally, the Main Server 210 may be in signal communication with the Geolocation Server 204, End-User Application 216, and communication network Infrastructure 212 via signal paths 226, 228, and 230, respectively. The Infrastructure 212 may also be in signal communication with the Basestation 214 via signal path 232. Similarly, the Communication Section 218 may be in signal communication with the Position-determination Section 220 and Basestation 214 via signal paths 234 and 236, respectively.

The Position-determination Section 220 includes a GPS engine (not shown) and communication section 218 includes a CP section (not shown) that are in signal communication via signal path 234 that may be any appropriate interface including, as examples, an RS232 protocol data link, AI3 interface (designed by SiRF Technology, Inc. of San Jose, Calif.) or other similar type of interface. The Position-determination Section 220 is a device, component, module, or section of the ALCD 206 that includes a GPS engine and is capable of determining the location of ALCD 206 autonomously or with assistance from the Geolocation Server 204.

As an example, the Position-determination Section 220 may include a SiRFLoc® Client or other similar type of device. The GPS engine in the Position-determination Section 220 may include a either GPS receiver or GPS tracker. The difference being that a GPS receiver is a device capable of receiving the GPS signals 224 and, in response, determine both the pseudorange values for the received GPS signals 224 and a resulting location of the ALCD 206 based on the pseudorange values, while a GPS tracker is a device capable of only receiving the GPS signals 224 and determining the corresponding pseudorange values without determining a resulting location of the ALCD 206 based on the pseudorange values.

The Communication Section 218 is a device, component, module, system or section of the ALCD 206 that includes a CP section (not shown) that is capable of communicating with Communication Network 208 via signal path 236. The CP section may include a wireless transceiver capable of transmitting and receiving information via any type of wireless network and is capable of client-side standard-based over-the-air ("OTA") protocol handling that includes A-GPS functionality and GPS position computation in a client/server architecture. Additionally, the CP section also supports hybrid positioning (positioning using wireless network statistics, position fusion etc.), network-enhanced A-GPS aiding, and caching of network and users information.

The Infrastructure 212 and Basestation 214 may be part of wireless network such as cellular telephone network, PCS, two-way paging, Specialized Mobile Radio ("SMR"), Short Messaging Service ("SMS"), or Wi-Fi® network, etc. As an example, the Infrastructure 212 and Basestation 214 may be a cellular and/or cellular/land-based telephone network or wireless Wi-Fi® network supporting IEEE standard 802.11.

The Main Server 210 may be a system capable of communicating with the Geolocation Server 204, Infrastructure 212, and Communication Section 218. The Main Server 210 may run End-User Applications 216 that may either monitor, modify, or test the Geolocation Server 204 and/or the Communication Network 208.

The Geolocation Server 204 is a system capable of gathering aiding information (such as, for example, position and timing information) that may be provided to the ALCD 206 to assist the ALCD 206 in determining its location. The Geolocation Server 204 includes at least one GPS receiver (not shown) and may include a GPS data center (not shown). If the Geolocation Server 204 includes a series of reference receivers (not shown), the series of reference receivers may compute the position of the reference receivers and extract GPS data from the GPS signals 222. The extracted GPS data (such as, for example, time, Doppler, frequency, etc.) is sent to the GPS data center, for all of the visible GPS satellites in the GPS constellation 202. When needed, the Geolocation Server 204 extracts the GPS data from the GPS data center for use by the End-User Application 216 and ALCD 206, and transmits the GPS data to the ALCD 206 or the End-User Application 216. Additionally, the Geolocation Server 204 is a system capable of providing A-GPS aiding, GPS position computation, standard-based OTA protocol handling, and session handling.

As an example, the Geolocation Server 204 may include a SiRFLoc® Server or other similar type of device. The Main Server 210 may communicate with the Geolocation Server 204, End-User Application 216, and Infrastructure 212 via signal paths 226, 228, and 230, respectively, which may be land-based and/or wireless network or interfaces. As an example, the signal paths 226, 228, and 230 may be interfaces that support the TCP/IP protocol. Instead of being separate servers, the Geolocation Server 204 and Main Server 210 may be either co-located or the same server if desired or necessary.

In general, as an example of the functionalities in the Geolocation Server 204, the Geolocation Server 204 is a device/system configured to support positioning, positioning aiding, learning for aiding, and/or learning for positioning. The Geolocation Server 204 may include the following features:

1. Protocol handling for hybrid positioning (e.g. routing the Communication Network 208 statistics to the correct non-GPS positioning server/engine).

2. Position fusion of multiple positions.

3. Usage of aiding from network-enhanced A-GPS aiding server/engine, such as non-GPS position servers (not shown), and updating the network-enhanced A-GPS aiding server/engine databases such as network-enhanced aiding databases. Support of cross-aiding between different technologies. For example, using GPS timing from one ALCD 206 to tag network times so other ALCDs may obtain better time aiding when doing GPS acquisition.

4. Iterative positioning depending of the quality of position specified by a application, and the timing of position from various sources, where the Geolocation Server 204 may use early, rough position estimate to refine the final position.

5. Support of any cross-positioning technology.

Figure 3:
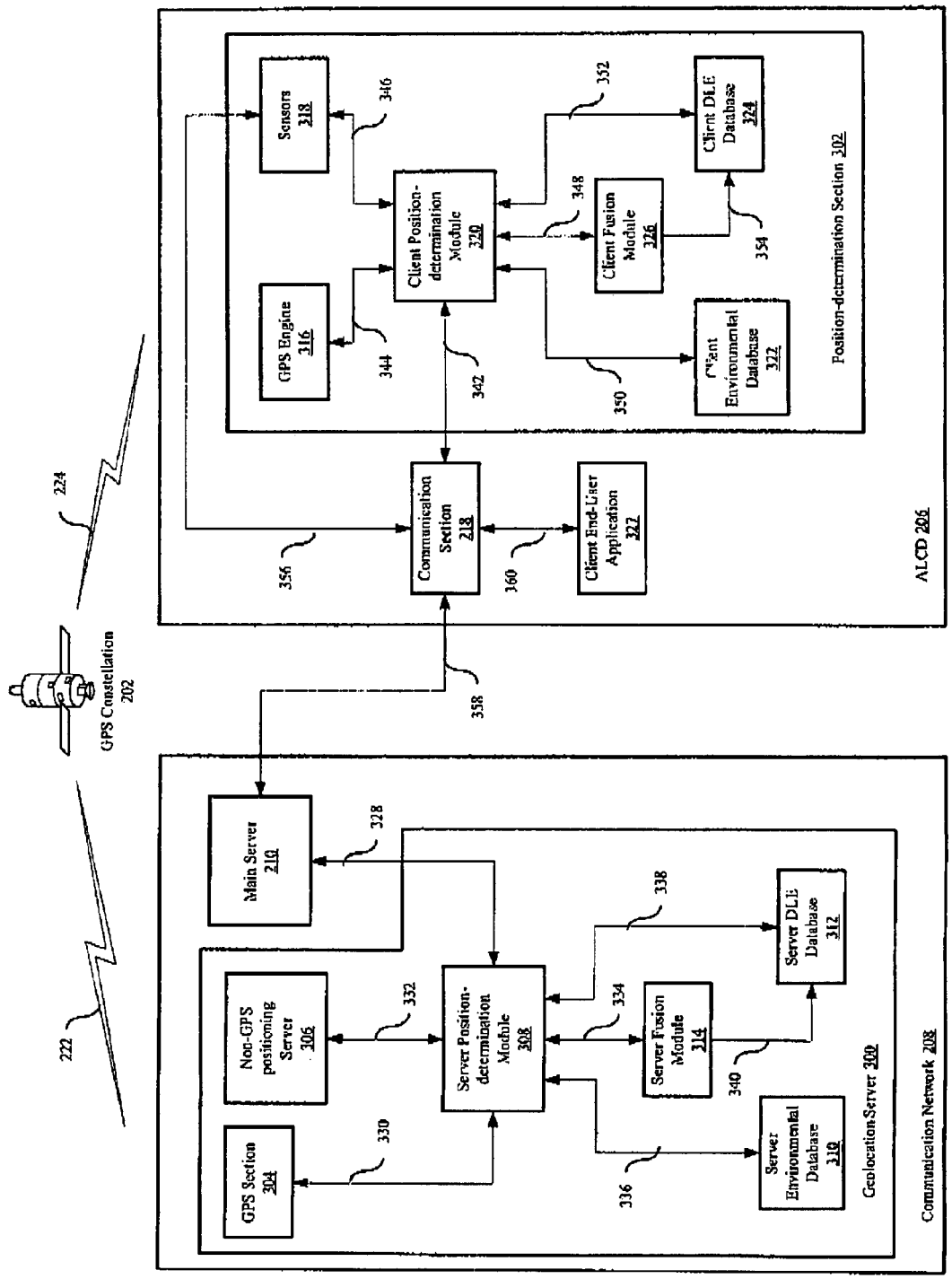
FIG. 3 shows a block diagram of an example of an implementation of both the Geolocation Server and Position-determination Section shown in FIG. 2

FIG. 3 shows a block diagram of an example of an implementation of both the Geolocation Server 300 and position-determination section 302 shown in FIG. 2. The Geolocation Server 300 may include a GPS section 304, Non-GPS position server 306, Server Position-determination Module 308, Server Environmental Database 310, Server Dynamic Learned Environmental ("DLE") Database 312, and Server Fusion Server Module 314. Similarly, the Position-determination Section 302 may include a GPS Engine 316, sensors 318, Client Position-determination Module 320, Client Environmental Client Database 322, Client DLE client database 324, and Client Fusion Module 326. The ALCD 206 may also include a Client End-User Application 327.

The sensors 318 may be at least one sensor capable of sensing non-GPS aiding information. The Sensors 318 may be part of the position-determination section 302 or a device, or devices, external to the position-determination section 302. Similarly, in the Geolocation Server 300 the GPS section 302 and Non-GPS position server 304 may be part of the Geolocation Server 300 or devices external to the Geolocation Server 300.

Additionally, the Server Environmental Database 310, Server DLE Database 312, Client Environmental Database 322, and Client DLE Database 324, are aiding databases. As an example in a cellular telephone application, the aiding databases include multi-parameter hybrid-position data that includes as parameters position, timing, cellular characteristic measurement data, GPS and non-GPS positional data, etc. In this example, the Client Environmental Database 322 may include one of more databases such as, for example, a cell area coverage information (also known as a cell identification, "CellID" or "Cell ID") database of the caller as a coarse location, Received Signal Strength Indication ("RSSI") database and the Client DLE Database 324 may include one or more databases such as CellID Phase0 database, Local Measurement Unit ("LMU") database, Virtual LMU ("VLMU") time aiding database, and VLMU Enhanced-Observed Time Difference ("EOTD") database. Where VLMU is described by U.S. application Ser. No. 10/874,775, filed on Jun. 23, 2004, titled "Virtual Satellite Positioning System Server," to Pande et al., which is herein incorporated by reference in its entirety. The CellID Phase0 database is a database that maps a CellID to an approximate position of an ALCD with an uncertainty range, where the position is an estimate from previous generated positions reported by other ALCDs from the same cell. The VLMU EOTD database is a database that is similar to (or even the same as) the VLMU database, but unlike the VLMU database, the VLMU EOTD database assists in determining a position of the ALCD based on the observed time difference between transmitters. In general, the VLMU EOTD database utilizes an EOTD process that is based on measurements taken at the ALCD of the enhanced Observed time difference of arrival of signal bursts from nearby pairs of basestations utilizing the relative timing offsets of signals received from the basestations by the ALCD together with the relative timing offsets of the same signals received by a fixed receiver in the communication network that has a known position.

The Server Position-determination Module 308 may be in signal communication with the Main Server 210, GPS Section 304, Non-GPS Positioning Server 306, Server Fusion Module 314, Server Environmental Database 310, and Server DLE Database 312 via signal paths 328, 330, 332, 334, 336, and 338, respectively. The Server Fusion Module 314 may also be in signal communication with the Server DLE Database 312 via signal path 340.

Similarly, the Client Position-determination Module 320 may be in signal communication with the Communication Section 218, GPS Engine 316, Sensors 318, Client Fusion Module 326, Client Environmental Database 322, and Client DLE Database 324 via signal paths 342, 344, 346, 348, 350, and 352, respectively. The Client Fusion Module 326 may also be in signal communication with the Client DLE Database 324 via signal path 354. The Client Fusion Module 326 may also be in signal communication with the Client DLE Database 324 via signal path 354 and the Communication Section 218 may be in signal communication with the Sensors 318 via signal path 356. Moreover, the Main Server 210 may be in signal communication with the Communication Section 218 via signal path 358 and the Communication Section 218 may be in signal communication with the Client End-User Application 327 via signal path 360.

Figure 4:
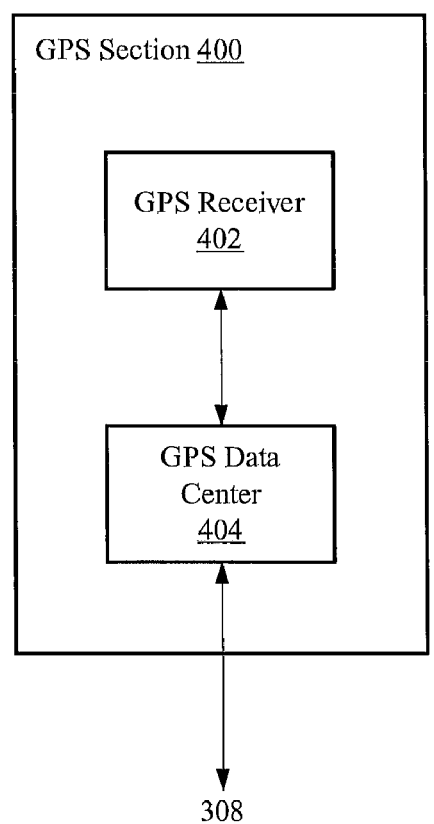
FIG. 4 shows a block diagram of an example of an implementation of the GPS Section shown in FIG. 3.

The GPS Section 304 may be a device of system that is capable of receiving GPS signals 222 and sending any requested GPS related data to the Server Position-determination Module 308 via an interface along signal path 330. The signal path 330 may be an interface that supports the TCP/IP Protocol. As seen in FIG. 4, the GPS Section 400 may include at least one GPS receiver 402 and a GPS data center 404.

Turning back to FIG. 3, the Non-GPS positioning Server 306 is a device or system capable of determining the location of the ALCD 206 without utilizing GPS. The Non-GPS positioning Server 306 may include one or more Non-GPS positioning servers. Each non-GPS position server in the Non-GPS position server 306 may be a hybrid position server and/or engine. The Non-GPS positioning server(s) of the Non-GPS position server 306 may produce multiple types of positioning results produced by different positioning engines that may be fused to data that is stored in the aiding databases.

The Server Environmental Database 310 and Server DLE Database 312 are both aiding databases located at the Geolocation Server 300. While FIG. 3 shows them as separate databases, they may be alternatively a signal aiding database or multiple databases based on the design preferences in implementing the Geolocation Server 300. As an example (similar to the one described above), the Server Environmental Database 310 may include one of more databases such as, for example, a CellID database, RSSI database and the Server DLE Database 312 may include one or more databases such as CellID Phase0 database, LMU database, VLMU time aiding database, and VLMU EOTD database.

Figure 5:
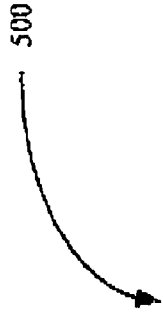
FIG. 5 shows a block diagram of an example of an implementation of the format of a data entry utilized in an aiding database shown in FIG. 3.

An example format of data entry 500 in the aiding databases is shown in FIG. 5. The data entry 500 may include various parameters that are associated to position data 502.

Examples of these parameters may include network identification data 504 that identifies the type of and location of the network that the ALCD 206 is operating within. Examples of the network identification data 504 may include mobile country and network codes, location area codes, cell identity, cell identification information, absolute radio frequency channel number, basestation identity code, approximate position of the cell center point, latitude of cell center point, longitude of the cell center point, structure of different coverage contures for the cell, RSSI level associated with the conture, points describing coverage of the cell, etc. In this example, the cell may be a reference cell of which the ALCD is associated with when the ALCD reports the position data 502, or alternatively, all cells of which the ALCD may can detect when the ALCD reports the position data 502). The cell mapping data 506 may include various types of information related general and specific characteristics of the cell that the ALCD 206 is located within. The Measured Characteristic Data 508 may include various types of measured values such as measured power, signal strength, network statistics, Doppler, timing, signal-to-noise ratio ("S/N"), bit error rate, fading, multipath, interference, frequency drift, etc. The GPS data 510 may include actual measured GPS data for a given position and GPS related data such as absolute GPS time, pseudoranges, Doppler, signal strength, S/N, ephemeris, almanac, multipath, etc. The Non-GPS position data 512 may include any type of position data received that corresponds to the position data 502. The Non-GPS position data 512 may include an indication of which information from the Network Identification Data 504, Cell Mapping Data 506, and Measured Characteristic Data 508 are utilized in computing certain parts of the position data 502.

Again turning back to FIG. 3, the Server Position-determination Module 308 is a device capable of receiving position information from the GPS Section 304, Non-GPS Positioning Server 306, Server Environmental Database 310, Server DLE Database 312, and the ALCD 206 and, in response, produce both an iterative and final location result for the position of the ALCD 206. The Server Fusion Module 314 is a device capable of fusing the resulting final location data for the position of the ALCD 206 with the position information from the GPS Section 304 and Non-GPS Positioning Server 306 and the Communication Network 208 location data and characteristic data, measured by the ALCD 206, to produce an updated data entry (similar to the one shown in FIG. 5) that is written to the Server DLE Database 312 so as to update the database.

Similarly, the Client Position-determination Module 320 is a device capable of receiving position information from the GPS Engine 316, Sensors 318, Client Environmental Database 322, Client DLE Database 324, and the Geolocation Server 300 and, in response, produce both an iterative and final location result for the position of the ALCD 206. The Client Fusion Module 326 is a device capable of fusing the resulting final location data for the position of the ALCD 206 with the position information from the GPS Engine 316 and Sensors 318 and the Communication Network 208 location data and characteristic data, measured by the ALCD 206, to produce an updated data entry (similar to the one shown in FIG. 5) that is written to the Client DLE Database 324 so as to update the database.

Similar to the Geolocation Server 300, the Client Environmental Database 322 and Client DLE Database 324 are both aiding databases located at the Position-determination Section 302. Again, while FIG. 3 shows them as separate databases, they may be alternatively a signal aiding database or multiple databases based on the design preferences in implementing the Position-determination Section 302. Again, the GPS Engine 316 may include a either GPS receiver (not shown) or GPS tracker (not shown).

The Client End-User Application 327 may be a module that allows a user to either direct or program how the position-determination section 302 functions. As an example, if a user initiates an E911 call, the Client End-User Application 327 would direct the position-determination section 202 to determine an accurate position result for the location of the ALCD 206 that would be transmitted to the E911 call center. Similarly, if the user desires to know the location of the ALCD 206 in a non-emergency situation, the user may direct the position-determination section 302 (through the Client End-User Application 327) to produce an accurate location of the ALCD 206. The Client End-User Application 327 also allows the user to program the ALCD 206 to produce location information for the ALCD 206 under certain predetermined situations. As an example, a parent may program a child's cellphone (having the ALCD) to produce and transmit position data of the location of the cellphone when parent calls the cellphone. In another example, the ALCD may be programmed to start producing accurate position information when the ALCD travels to a predetermined location. As an example, an ALCD in a vehicle located in San Jose, Calif. and traveling to San Francisco, Calif. may be programmed to start determining accurate position information only once the vehicle enters San Francisco. Similarly, the End-User Application 216 may be a module that also allows a user (such as a network provider) to either direct or program how the position-determination section 302 functions. Moreover, the Client End-User Application 327 and End-User Application 216 may incorporate location-based service ("LBS") information that may be triggered when the ALCD 206 enters certain predefined locations. Examples of these types of LBS services are described in U.S. patent application Ser. No. 11/089, 455, filed on Mar. 24, 2005 to Chang et al. and titled "System and Method For Providing Location Based Services Over A Network," which is herein incorporated by its entirety. It is appreciated that the Client End-User Application 327 may be either a separate application from the End-User Application 216 or it may be the same application that is provided to the ALCD 206 via the network interface 236.

Figure 6:
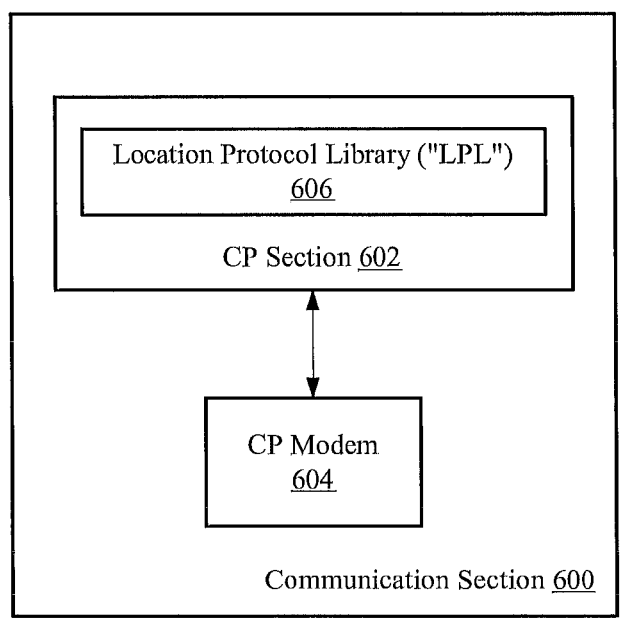
FIG. 6 shows a block diagram on an example of an implementation of Communication Section shown in FIG. 3.

As described above and shown in FIG. 6, the Communication Section 600 is a device, component, module, system or section of the ALCD 206 that may include a CP section 602 and a CP modem 604. The CP Section 602 may include a Location Protocol Library ("LPL") 606. In this example, the CP Modem 604 may include a wireless transceiver (not shown) capable of transmitting and receiving information via any type of wireless network. The LPL 606 is capable of client-side standard-based OTA protocol handling and processing end-use location requests. Additionally, the LPL 606 may include A-GPS and GPS position computation functionality and may also support hybrid positioning, network-enhanced A-GPS aiding, and caching of network and users information. The CP Section 602 includes a protocol layer of the transceiver that handles functionalities such as mobility management, measurement collection, and it interfaces with the LPL 606.

In general, as an example of functionalities in the Communication Section 600, the Communication Section 600 is a device/system configured to support the following features:

1. Storing & sending network measurements necessary for hybrid positioning to the Geolocation Server 300.

2. Performing hybrid positioning utilizing network measurements if possible.

3. Combining network information gathered and network-enhanced A-GPS aiding (from the interface between the main server 210 and CP modem 604) to provide better aiding for either the Server or Client position-determination sections 308 and 320. Sending the network-enhanced A-GPS measurement to the Geolocation Server 300.

4. Handling more complex location requests from either the End-User or Client End-User applications 216 or 327, where the requests may be trigger based, threshold based positioning, etc.

5. Session management to support multiple location application sessions.

6. Support context awareness by using a user profile database, and perform background location collection, filtering of positions according to the user profile, passively presented to the user.

The LPL 606 is a module that includes a database that is capable of performing the following features:

1. Handling network measurements necessary for positioning and aiding.

2. Receiving sensor measurements from sensors 318 and provide them to either the Position-determination Section 302 or the Geolocation Server 300.

3. Combining network information, and network-enhanced aiding to provide improved aiding for either the Position-determination Section 302 or the Geolocation Server 300.

4. Combining position inputs and/or corrections from the Client End-User Application 327 or End-User Application 216 to improve determination of position of the ALCD 206.

5. Handling complex position measurements that include threshold, event, or trigger based measurements.

6. Providing session management for multiple sessions.

7. Supporting context determination.

8. Providing better positions based on context or filtered positions based on user profile and context.

9. Providing AGPS-GPS handling and any over-the-air location protocols with the Geolocation Server 300.

It is appreciated by those skilled in the art, that nine features described are shown as examples and that other similar types of features may also be supported by the LPL 606 without departing from the scope of the invention. Additionally, it is appreciated that the LPL 606 may be part of the position-determination section 302 instead of the CP Section 602, or the LPL 606 may be part of both.

Different Modes Of Operation

Generally as an example of operation, the ALCS 200 supports the ALCD 206 operating in different modes depending on a number of variables such as signal strength, operator intervention, type of services desired or requested, performance expectation, e.g., TTFF of a few seconds vs. tens of seconds, etc. The ALCD may operate in a GPS-standalone mode, GPS-autonomous mode, GPS-network-aided mode, GPS-network-centric mode, reverse-aiding mode, network-based and augmented-aiding mode, hybrid positioning mode, cross-technology aiding mode, user and/or network data catching and filtering mode, and iterative position refinement mode. These multiple modes of operation allow the ALCD to operate in various environments and to receive and/or send "aiding" information to or from an external network or external aiding devices. The operation of each mode is described below.

GPS-standalone Mode

The ALCD 206 may be utilized in a "GPS-standalone" mode, when the GPS Engine 316 is receiving a strong GPS signal 224, has recent ephemeris or almanac data, or when an exact position is not required. In the GPS-standalone mode, the position-determination section 302 does not receive any aiding and therefore operates independently from any available external networks or external aiding devices. In the GPS-standalone mode, the GPS Engine 316 acquires GPS satellite signals 224, and utilizes those GPS signals 224 to determine the location of the ALCD 206. The GPS Engine 316 may also utilize the GPS satellite signals 224 for tracking, and, if desired, navigation functions in the ALCD. The determined position of the ALCD 206 may be utilized internally to the position-determination section 302 or external to the position-determination section 302 and internally to the communication section 218 within the ALCD 302.

GPS-autonomous Mode

In another example, the ALCD 206 may be utilized also in a "GPS-autonomous" mode, where the GPS Engine 316 again receives a strong GPS signal 224, has recent ephemeris or almanac data, or when an exact position is not required. Similar to the GPS-standalone mode, in the GPS-autonomous mode the position-determination section 302 does not receive any aiding and therefore operates independently from any available external networks including the Geolocation Server 300. In the GPS-autonomous mode, the GPS Engine 316 acquires GPS signals 224, and uses those GPS signals 224 to determine the location of the ALCD 206. The GPS Engine 316 may also use the GPS signals 224 for tracking, and, if desired, navigation functions. However, instead of only utilizing the determined position internally to the ALCD 206, in the autonomous mode, the ALCD 206 also transmits the determined position of the ALCD 206 to the Geolocation Server 300, End-User Application 216 or other similar devices/networks.

Reverse-aiding Mode

In yet another example, the ALCD 206 may be utilized also in a "reverse-aided" mode, where the GPS Engine 316 again receives a strong GPS signal 224, has recent ephemeris or almanac data, or when an exact position is not required. Similar to the GPS-autonomous mode and GPS-standalone mode, in the reverse-aided mode the position-determination section 302 in the ALCD 206 does not receive any aiding and therefore operates independently from any available external networks including the Geolocation Server 300. In reverse-aiding mode, the GPS Engine 316 acquires GPS signals 224, and uses those GPS signals 224 to determine the location of the ALCD 206. The GPS Engine 316 in the position-determination section 302 may also use the GPS signals 224 for tracking, and, if desired, navigation functions. However, instead of using the determined position internally to the ALCD 206, in the reverse-aiding mode, the ALCD 206 transmits various types of measured information at the GPS Engine 316 to Geolocation Server 300.

GPS-network Aided Mode

In still another example, the ALCD 206 may operate in a "GPS-network aided" mode if the GPS Engine 316 in the ALCD 206 does not receive a strong enough GPS signal 224, such as when the ALCD 206 is utilized indoors, the position-determination section 302 may switch to a different mode of operation where the Geolocation Server 300 may help (i.e., "aid") the position-determination section 302 to acquire, track, and/or navigate using the GPS signals 224 received by the GPS Engine 316 with additional information supplied by the Geolocation Server 300. The additional information may include almanac or sub-almanac information, coarse position information, Doppler data, in-view satellite positions, time and frequency aid, received wireless radio signal strength, or other aids that will aid the GPS Engine 316 in acquiring the information that the GPS Engine 316 needs to acquire, navigate, or track. The GPS-network aided mode approach differs from a "GPS-network centric" mode (also known as "GPS-mobile based" mode or "network-assisted" mode in other known literature) approach because in the GPS-network-aided mode approach, the GPS Engine 316 in the ALCD 206 is capable of eventually obtaining the position and tracking information needed to locate the ALCD 206 by itself.

Network-based Mode

Additionally in another example, the ALCD 206 may operate in a "network-based" mode in situations where the ALCD 206 is utilized in an even harsher signal reception environment and the GPS Engine 316 cannot receive any GPS signals 224. As such, the position-determination section 302 may be completely dependent on the Geolocation Server 300 to obtain any positioning information. Typically, network-based modes compute position without using GPS or other GPS satellite information. Positions of the ALCD 206 are derived from network resources such as cellular transmitter towers, Time Difference of Arrival ("TDOA") techniques, non-cellular wireless networks, etc.

GPS-network-centric Mode

Additionally in another example, the ALCD 206 may operate in the "GPS-network-centric" mode in situations where the GPS Engine 316 is constrained in performance or where the location of the ALCD 206 is computed on the Geolocation Server 300. As such, the ALCD 206 receives the signals in the position-determination section 302 and transmits the position related data to the Geolocation Server 300 for final position computation. This mode is also known as the "mobile-assisted" mode.

Augmented-autonomous Mode

In another example, the ALCD 206 may operate in an "augmented-autonomous" mode (also known as "augmented-aiding mode") in situations where the ALCD 206 is utilized in a harsh signal reception environment and cannot receive any GPS signals 224. In the augmented-autonomous mode, the ALCD 206 may utilize various types of external location-aiding sources/devices or external networks to obtain location information that may be totally independent of any GPS information. This external location-aiding may be obtained from the sensors 318. In the augmented-autonomous mode, the ALCD 206 or the Geolocation Server 300 computes the position of the ALCD 206 without using GPS or other GPS satellite information. Positions of the ALCD 206 are derived from network resources such as computer networks, communication networks, wireless networks or external devices that may transmit location information.

Cross-technology Aiding Mode

The Cross-technology Aiding Mode is similar to the augmented-autonomous mode in that the position of the ALCD 206 may be determined with aiding information that is non-GPS based. However unlike the augmented-autonomous mode, the ALCD 206 may utilize aiding information based on Non-GPS position data received from either the Sensors 318 or the Non-GPS Position Server 306 and the mode may be preformed by both the ALCD 206 and Geolocation Server 300. "Cross-technology" refers to the different types of non-GPS information that may be utilized.

Hybrid Positioning Mode

In general, the ALCD 206 and Geolocation Server 300 may operate in a "Hybrid positioning" mode. The Hybrid positing mode is an enhanced aiding mode may operate simultaneously with the GPS-standalone mode, GPS-autonomous mode, GPS-network-aided mode, GPS-network-centric mode, Reverse-aiding mode, Network-based and Augmented-autonomous mode, cross-technology aiding mode, user and/or network data catching and filtering mode, and iterative position refinement mode. The Hybrid positioning mode includes fusing multiple types of positioning results produced by different positioning engines to produces a final position result for the ALCD 206. The fusion process may be repeated as many times as the number of hybrid engines supported by the ALCS 200.

Iterative Position Refinement Mode

The ALCD 206 and Geolocation Server 300 may operate in an "Iterative Position Refinement" mode that iteratively improves the aiding data in the server and client databases in the Geolocation Server 300 and ALCD 206. This mode may be performed by either the Geolocation Server 300, ALCD 206, or both.

User and/or Network Data Catching and Filtering Mode

The ALCD 206 and Geolocation Server 300 may operate in a "User and/or network data catching and filtering" mode that allows the server and client aiding databases to be filtered by either network or user-defined parameters. Additionally, the mode allows the Geolocation Server 300 to update the client aiding database to reflect the current aiding data in the server aiding databases. The mode also allows the reverse in the case that the client aiding databases are more up-to-date than the server databases.

Switching Between Modes

The ALCD 206 may switch between these modes of operation based on several variables, as well as user-selected preferences or demands, and may switch either via local or remote control, or via either automatic or manual commands given to the ALCD 206 by the End-User Application 216 or Client End-User Application 327. Additionally, the ALCD 206 may operate multiple modes simultaneously.

Timing Issues with Aiding

An important part of acquisition aiding in the ALCS 200 is providing the ALCD 206 with accurate time. In systems where time is synchronized throughout the network, the offset to absolute time is constant. However, many systems have some notion of time but it is not synchronized between zones/transmitters nor is its relationship to a fixed time, e.g., GPS time, controlled in any manner. Approaches to address this issue include deploying a large number of continuously operating, fixed sites known as LMUs that constantly monitor the relative offset of each zone/cell and a fixed reference like GPS.

It is appreciated that if the ALCD 206 is capable of autonomously calculating its GPS position, it has already solved for GPS time. The ALCD 206 may then calculate the offset between the "system" time of the Communication Network 208 as determined by the Communication Section 218 and GPS time. The offset and the cell it is associated with may then be stored in an aiding database.

Each transmitter/cell site (such as Basestation 214) has a clock (not shown) that can drift. When the ALCD 206 obtains a position fix in that cell site (corresponding to the basestation 214), the ALCD 206 receives GPS time from the GPS signal 224, and is capable of calculating the offset between GPS time and the cell site clock. This offset may be stored in a client aiding database of the ALCD 206, and/or transmitted to the Geolocation Server 204 in a reverse-aiding mode for storage in a server aiding database.

Each time the ALCD 206 goes through the cell, the offset can be updated, and drift rates can be determined. These drift rates can be transmitted to the Geolocation Server 300 in a reverse-aiding mode for assisting other ALCDs. In this scenario, the ALCD 206 may determine the time offset and frequency drift of the cell covered by the basestation 214 and in effect act as a VLMU that is capable of reporting the offset and drift either to the Geolocation Server 300 or directly to other ALCDs via the Communication Network 208.

Example of Operation

In an example of operation, the ALCD 206 may measure characteristic information for the Communication Network 208 with at least one sensor 318 at the ALCD location. The measured characteristic information may include CellID for Basestation 214, RSSI, and other types of network statistics.

In one example scenario of operation, the ALCD 206 may then compare the measured characteristic information against position data stored in a client aiding database such as, for example, the Client Environmental Database 322 or Client DLE Database 324. The Client Environmental Database 322 may be a raw database that takes in raw measurements of each cell. The measurements to be stored in the Client Environmental Database 322 can differ from one positioning method to another. The Client DLE Database 324 may be an aggregated database which contains aggregated results for each cell that are updated by the Client Fusion Module 326. The Client Position-determination Module 320 then determines an initial coarse position for the ALCD 206 based on the comparison of measured characteristic information against position data stored in the Client Environmental Database 322 or Client DLE Database 324. If the initial coarse position is acceptable, the Client Position-determination Module 320 may utilize the coarse position as the location of the ALCD 206, fuse it to measured characteristic information, and update the Client DLE Database 324 with the new fused data entry. This example scenario illustrates the ALCD 206 operating simultaneously in a Hybrid positioning mode, Iterative Position Refinement mode, and Augmented-autonomous mode.

If the initial coarse position is not acceptable, the ALCD 206 may attempt to determine a better position using either GPS or non-GPS aiding signals. If the ALCD 206 is capable of receiving GPS signals (i.e., GPS signals are available of sufficient strength and quality), the ALCD 206 may determine the location of the ALCD 206 using GPS. The Client Position-determination Module 320 may then utilize the GPS determined position of the ALCD 206 as the location of the ALCD 206, fuse it to measured characteristic information and GPS data (from the received GPS signals), and update the Client DLE Database 324 with the new fused data entry. This example scenario illustrates the ALCD 206 operating simultaneously in a Hybrid positioning mode, Iterative Position Refinement mode, and/or GPS-standalone mode.

Alternatively, if the ALCD 206 is capable of receiving GPS signals, the ALCD 206 may transmit the measured characteristic information and GPS data to the Geolocation Server 300. The Geolocation Server 300 may determine the location of the ALCD 206 using the received GPS data. The Server Position-determination Module 306 may then utilize the GPS determined position of the ALCD 206 as the location of the ALCD 206, fuse it to measured characteristic information and GPS data, and update the Server DLE Database 312 with the new fused data entry. This example illustrates the ALCD 206 operating simultaneously in a Hybrid positioning mode, Iterative Position Refinement mode, reverse-aiding mode, and/or GPS-network aided mode.

In this example, the Client Environmental Database 322 and/or Client DLE Database 324 may then be updated by the Geolocation Server 300 such that the Client Environmental Database 322 and Client DLE Database 324 are the same as the Server Environmental Database 310 and Server DLE Database 312, respectively. This example scenario illustrates the Geolocation Server 300 and ALCD 206 operating in the User and/or network data catching and filtering mode.

If the ALCD 206 is not capable of receiving GPS signals (i.e., GPS signals are not available or are available with poor strength and/or quality), the ALCD 206 may attempt to determine a better position using non-GPS aiding signals. If the ALCD 206 is capable of receiving non-GPS aiding signals with the sensors 318, the ALCD 206 may determine the location of the ALCD 206 using the non-GPS aiding signals. Examples of these non-GPS aiding signals may include cellular identification data, Wi-Fi® aiding data, Bluetooth® aiding data, or other similar wireless aiding data and the ALCD 206 may attempt to utilize as many non-GPS aiding signals as is available from the number of sensors 318. The Client Position-determination Module 320 may then utilize the non-GPS determined position of the ALCD 206 as the location of the ALCD 206, fuse it to measured characteristic information and non-GPS data, and update the Client DLE Database 324 with the new fused data entry. This example scenario illustrates the ALCD 206 operating simultaneously in a Hybrid positioning mode, Iterative Position Refinement mode, Augmented-autonomous mode, and/or Cross-technology Aiding Mode.

In another scenario of operation, the ALCD 206 may transmit the measured characteristic information to the Geolocation Server 300. The Geolocation Server 300 may then compare the measured characteristic information against position data stored in a server aiding database such as, for example, the Server Environmental Database 310 or Server DLE Database 312. The Server Environmental Database 310 may be a raw database that takes in raw measurements of each cell. The measurements to be stored in the Server Environmental Database 310 can differ from one positioning method to another. The Server DLE Database 312 may be an aggregated database which contains aggregated results for each cell that are updated by the Server Fusion Module 314. The Server Position-determination Module 306 then determines an initial coarse position for the ALCD 206 based on the comparison of measured characteristic information against position data stored in the Server Environmental Database 310 or Server DLE Database 312. If the initial coarse position is acceptable, the Server Position-determination Module 306 may utilize the coarse position as the location of the ALCD 206, fuse it to measured characteristic information, and update the Server DLE Database 312 with the new fused data entry. This example scenario illustrates the ALCD 206 operating simultaneously in a Hybrid positioning mode and Reverse-aiding and/or Cross-technology Aiding Mode.

In this scenario, the Client Environmental Database 322 and/or Client DLE Database 324 may then be updated by the Geolocation Server 300 such that the Client Environmental Database 322 and Client DLE Database 324 are the same as the Server Environmental Database 310 and Server DLE Database 312, respectively. This example scenario illustrates the Geolocation Server 300 and ALCD 206 operating in the User and/or network data catching and filtering mode.

These scenarios may be repeated iterative until a final location of the ALCD 206 is determined that meets the desired accuracy of a given application that will utilize the location information.

Figure 7:
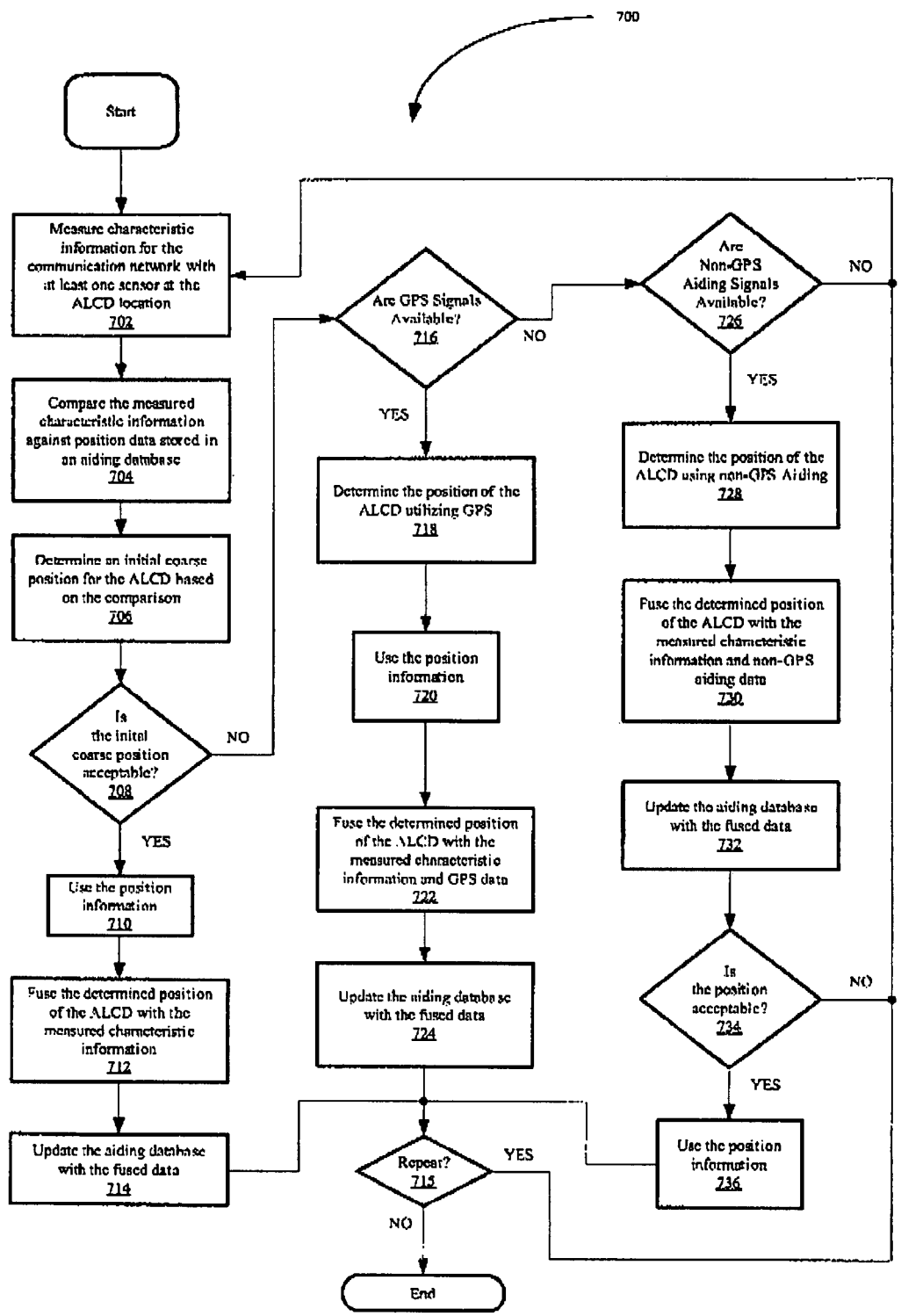
FIG. 7 shows a flowchart illustrating a process that is an example of the general operation of the ALCD shown in FIG. 3.

FIG. 7 shows a flowchart illustrating a process that is an example of the general operation of the ALCD shown in FIG. 3. The method begins at step 702, where the ALCD measures the characteristic information for the communication network at the ALCD location with at least one sensor. In step 704, the ALCD then compares the measured characteristic information against position data stored in an aiding database and, in step 706, determines an initial coarse position for the ALCD based on the comparison. In decision step 708, the ALCD determines whether the initial coarse position is acceptable based on the user and/or predetermined requirements. As an example, in an E911 call scenario the coarse position would be required to be within 50 feet of the actual position of the cellular telephone. However, in some location applications accuracy may be determined by an event, threshold, or trigger. As an example, if accurate position information is only needed within a specific area (i.e., within a given town), the ALCD only needs coarse position data that informs the ALCD that it is not within the specific area. Once the specific area is entered, an event has been triggered that requires that the ALCD produce positional information of greater accuracy than the initial coarse position.

If the initial coarse position is acceptable, the process continues to step 710. In step 710, the ALCD utilizes the position information and, in step 712, the determined position of the ALCD is fused with the measured characteristic information to produce fused data that is utilized to update the aiding database in step 714. The process then selectively either ends or repeats in step 715. If the process repeats, the process continues to step 702.

If, instead, the initial coarse position is not acceptable, the process continues to decision step 716. In decision step 716, the ALCD determines whether there are GPS signals available that the ALCD may utilize to determine its location. If GPS signals are available, the process continues to step 718. In step 718, the ALCD determines its position utilizing the GPS signals. In step 720, the ALCD utilizes the position information and, in step 722, the determined position of the ALCD is fused with the measured characteristic information and GPS data to produce fused data that is utilized to update the aiding database in step 724. The process then selectively either ends or repeats in step 715. If the process repeats, the process continues to step 702.

If, instead, the there are no GPS signals available that the ALCD may utilize to determine its location, the process continued to decision step 726. In decision step 726, the ALCD determines whether there are non-GPS aiding signals available that the ALCD may utilize to determine its location. If non-GPS aiding signals are available, the process continues to step 728. In step 728, the ALCD determines its position utilizing the non-GPS aiding signals. The ALCD utilizes the position information and, in step 730, the determined position of the ALCD is fused with the measured characteristic information and non-GPS aiding data to produce fused data that is utilized to update the aiding database in step 732. The process then selectively either ends or repeats in step 715. If the process repeats, the process continues to step 702.

If, instead, the there are no non-GPS aiding signals available that the ALCD may utilize to determine its location, the process repeats and continues to step 702.

As another example of operation, ALCDs in the ALCS 200 may continually collect network measurement information ("NMR") while they are in the ALCS 200. Combining NMR from an ALCD with cell database information allows the positioning system to increase overall positioning availability. In this example, a Cell-ID-based positioning method relies on an accurate cell database (with RSSI or coverage information) on the server-side or the client-side.

Figure 8:
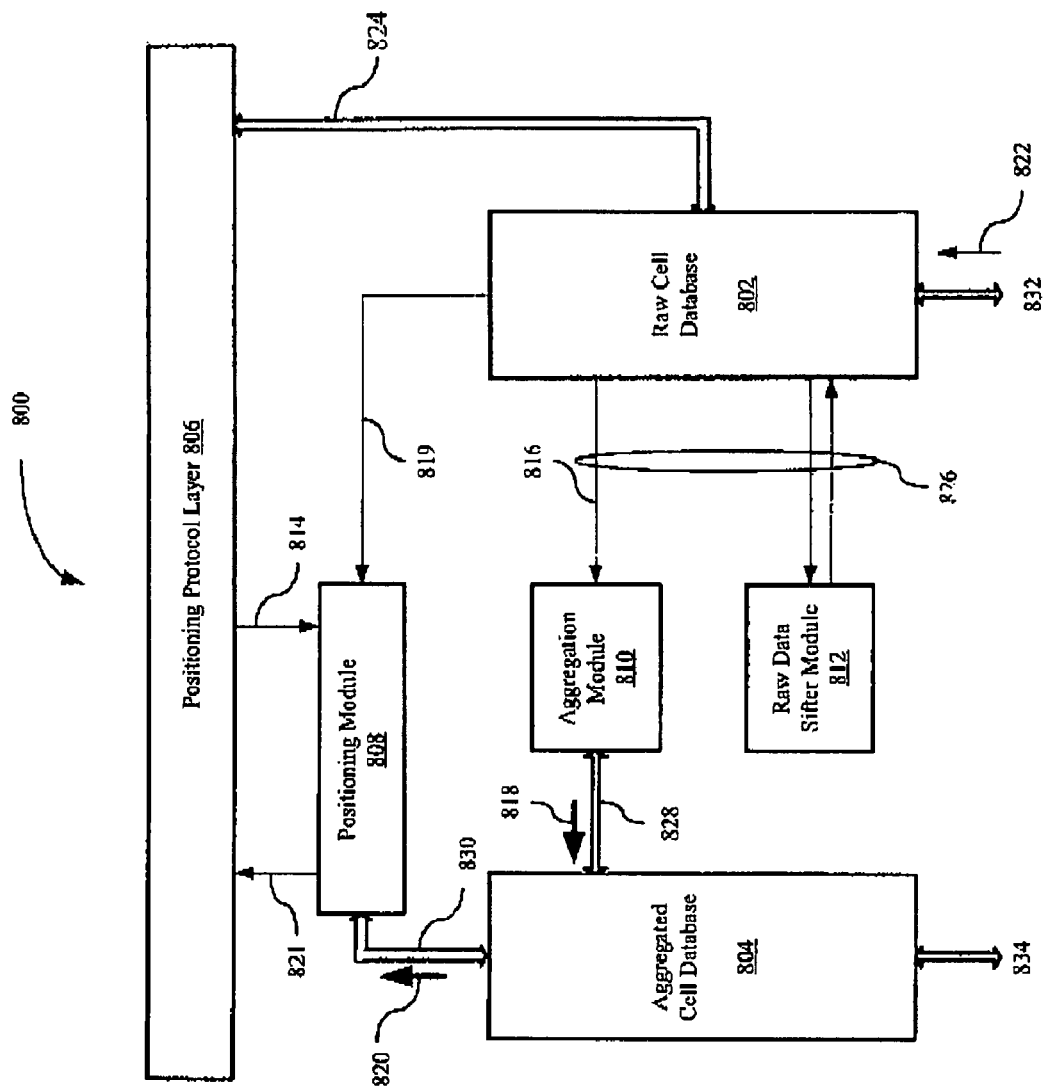
FIG. 8 is functional block diagram that illustrates the functional components and/or modules of an example of an implementation of a Server Architecture for different kinds of Cell-ID-based hybrid positioning methods that may be utilized in the ALCS.

FIG. 8 is functional block diagram that illustrates the functional components and/or modules of an example of an implementation of a Server Architecture 800 for different kinds of Cell-ID-based hybrid positioning methods that may be utilized in the ALCS 200. It is appreciated that the server architecture may be either server-side, client-side, or both (i.e., either the Geolocation Server 300, Position-determination Section 302, or both).

In this example, Server Architecture 800 is an end-to-end system that performs both AGPS positioning and Cell-ID/Cell-ID RSSI-based positioning in two stages: final position computation and AGPS approximate position generation. The Server Architecture 800 may utilize two positioning methods that include a radiant-based RSSI-positioning process and a cell-intersect positioning process.

For each hybrid positioning method, the functional components of the Server Architecture 800 may include a Raw Cell Database 802, Aggregated Cell Database 804, Positioning Protocol Layer 806, Positioning Module 808, Aggregation Module 810, and Raw Data Sifter Module 812.

While performing a hybrid positioning method, the Raw Cell Database 802 acquires raw measurements of each cell where the raw measurements may differ from one positioning method to another. Additionally, the Aggregated Cell Database 804 contains aggregated results for each cell.

During a positioning session, the positioning Module 808 is active in the server (either client-side, server-side, or both) and uses the Aggregated Cell Database 804, Raw Cell Database 802, along with the NMR 814 provided by the Positioning Protocol Layer 806 to produce a position.

In this example, the following processes may operate in the background of the server: the Aggregation Module 810, Raw Data Sifter Module 812, and a raw data sample generator (not shown). The Aggregation Module 810 aggregates the raw network measurements 816 produced by the Raw Cell Database 802 into aggregated results 818 per cell.

The aggregated results 820 and raw cell data 819 may then be utilized in the Positioning Module 808 to produce RSSI-based position data 821. This aggregation process performed by the Aggregation Module 810 may differ for each positioning method. This aggregation process may be performed dynamically at runtime to update the Aggregated Cell Database 804 while the server is performing positioning, or the aggregation process may be performed offline.

The Raw Data Sifter Module 812 may decide when the Aggregation Module 810 should be triggered for a cell, Raw Data Sifter Module 812 decides which raw data in the Raw Cell Database 802 is redundant and should be removed. The decision may be based on the number of raw samples, or on more complicated metrics such as uniformality of raw data in the cell area. The raw data sample generator is a module that generates raw data samples 822 for the Raw Cell Database 802.

The Server Architecture 800 may include the following interfaces: a first interface 824; second interface 826; third interface 828; fourth interface 830; fifth interface 832; and sixth interface 834. As an example, the first interface 824 includes a database record look-up/store function and a logging function that are triggered by a network measurement report from the server protocol layer 806. The information passed on the first interface 824 may include NMR plus GPS position and RSSI based position information from other positioning sessions. In this example, all cell measurements in the NMR 814 may be stored in the Raw Cell Database 802. The second interface 826 is a signal path in signal communication between the Raw Cell Database 802 and the Aggregation Module 810 and Raw Data Sifter Module 812. The second interface 826 supports efficient data sifting and aggregation. The third interface 828 allows the aggregated data 818 to be passed into the Aggregated Cell Database 804 by the Aggregation Module 810. The fourth interface 830 includes a database record look-up function that uses the NMR 814 to get the cell aggregated information. The fifth and sixth interfaces 832 and 834 allow database content to be uploaded and downloaded from/to files.

The Positioning Module 806 may utilize a cell-intersect process in determining a position where the Positioning Module 806 may receive as an input the NMR 814 and, in response, lookup cell coverage information for all cells in the Aggregated Cell Database 804, then invoke a cell-intersection process and an ellipse-fitting process to produce a final position and associated uncertainties. In general, the cell-intersection process is a cell identification process that utilizes cell area intersections. In this process, an ALCD typically receives signals from a basestation corresponding to the cell that the ALCD is within plus signals from other neighboring basestations in other cells. The information of the cell IDs of the detectable basestations may be utilized to obtain an estimate of the location of the ALCD. The process accomplishes this by finding intersections of the coverage areas of the basestations whose Cell IDs are reported by the ALCD. An example of this process is described in U.S. patent application Ser. No. 11/645,114, titled "System and Method for Estimating Cell Center Position For Cell ID Based Positioning," filed Dec. 22, 2006 to inventors X. Lin et al., which is herein incorporated by reference in its entirety.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. An Aided Location Communication System ("ALCS"), comprising:
    an geolocation server including a non-GPS position server, at least one server aiding database, server position-determination module, and a server fusion module; and
    an Aided Location Communication Device ("ALCD") including a communication section in signal communication with the geolocation server, and a position-determination section having a GPS Engine,
    wherein the ALCD is capable of selectively switching between a first position-determination mode for determining a geolocation of the ALCD and a second position-determination mode for determining the geolocation of the ALCD,
    wherein the geolocation server further includes a GPS section, and
    wherein the at least one server aiding database includes a server environmental database and a server dynamic learned environmental ("DLE") database, and
    wherein the position-determination section further includes at least one client aiding database, a client position-determination modules and a client fusion module, and
    wherein the at least one server aiding database includes a server environmental database and a server dynamic learned environmental ("DLE") database and wherein the at least one client aiding database includes a client environmental database and a client DLE database, and
    wherein the position-determination section further includes at least one sensor, and
    wherein the server position determination module is in signal communication with the GPS section, non-GPS positioning server, at least one server aiding database, and server fusion module, and wherein the server position determination module is configured to receive GPS data from the GPS section, non-GPS positioning data from the non-GPS positioning server, and database data from the at least one server aiding database, and in response produce position-determination data that is passed to the server fusion module, and
    wherein the server fusion module is in signal communication with the at least one aiding database, and wherein the server fusion module is configured to receive the position-determination data and fuse it together.

2. The ALCS of claim 1, wherein the ALCD is capable of selectively operating simultaneously in the first position-determination mode and the second position-determination mode.

3. A method for determining the geolocation of an Aided Location Communication Device ("ALCDD"), having a position-determination section and a communication section, within an Aided Location Communication System ("ALCS"), the method comprising:
    measuring characteristic information for a communication network of the ALCS;
    comparing the measured characteristic information against position data stored in an aiding database;
    determining an initial coarse position for the ALCD based on the comparison of the measured characteristic information against position data stored in an aiding database;
    determining whether the initial coarse position is acceptable;
    determining the position of the ALCD if the initial coarse position is not acceptable;
    fusing the measured characteristic information with the initial coarse position if the initial position is acceptable or fusing the measured characteristic information with the determined position if the initial position is not acceptable; and
    updating the aiding database with the fused data.

4. The method of claim 3, wherein determining the position of the ALCD if the initial coarse position is not acceptable includes determining the position of the ALCD selectively utilizing GPS signals or non-GPS aiding signals.

5. The method of claim 4, wherein fusing the measured characteristic information with the determined position if the initial position is not acceptable includes fusing the measured characteristic information with the determined position and GPS data derived from the GPS signals.

6. The method of claim 4, wherein fusing the measured characteristic information with the determined position if the initial position is not acceptable includes fusing the measured characteristic information with the determined position and non-GPS data derived from the non-GPS aiding signals.

7. The method of claim 4, wherein determining whether the initial coarse position is acceptable includes determining whether a predetermined event has occurred.

8. The method of claim 3, further including transmitting the measured characteristic information to a Geolocational Server in the ALCS but remote to the ALCD,
wherein measuring characteristic information for a communication network of the ALCS is preformed by the ALCD, and
wherein comparing the measured characteristic information against position data stored in an aiding database is preformed by the Geolocation Server,
wherein determining an initial coarse position for the ALCD based on the comparison of the measured characteristic information against position data stored in an aiding database is preformed by the Geolocation Server,
wherein fusing the measured characteristic information with the initial coarse position if the initial position is acceptable or fusing the measured characteristic information with the determined position if the initial position is not acceptable is preformed by the Geolocation Server, and
wherein updating the aiding database with the fused data is preformed by the Geolocation Server.

9. The method of claim 8, wherein determining the position of the ALCD if the initial coarse position is not acceptable includes determining the position of the ALCD selectively utilizing GPS signals or non-GPS aiding signals.

10. The method of claim 9, wherein fusing the measured characteristic information with the determined position if the initial position is not acceptable includes fusing the measured characteristic information with the determined position and GPS data derived from the GPS signals.

11. The method of claim 10, wherein fusing the measured characteristic information with the determined position if the initial position is not acceptable includes fusing the measured characteristic information with the determined position and non-GPS data derived from the non-GPS aiding signals.

* * * * *

UNITED STATES PATENT AND TRADEMARK OFFICE
CERTIFICATE OF CORRECTION

PATENT NO.        : 7,724,186 B2
APPLICATION NO.   : 11/772102
DATED             : May 25, 2010
INVENTOR(S)       : Wan et al.

Page 1 of 1

It is certified that error appears in the above-identified patent and that said Letters Patent is hereby corrected as shown below:

IN THE CLAIMS

In Column 20, Line 13, in Claim 1, delete "modules" and insert -- module, --, therefor.

In Column 20, Line 42, in Claim 3, delete "("ALCDD")," and insert -- ("ALCD"), --, therefor.

Signed and Sealed this
Fourteenth Day of August, 2012

David J. Kappos
*Director of the United States Patent and Trademark Office*